No. 610,377. Patented Sept. 6, 1898.
W. C. ANDERSON.
APPARATUS FOR PREPARING PRUNES FOR DRYING.
(Application filed Sept. 1, 1897.)
(No Model.) 2 Sheets—Sheet 1.
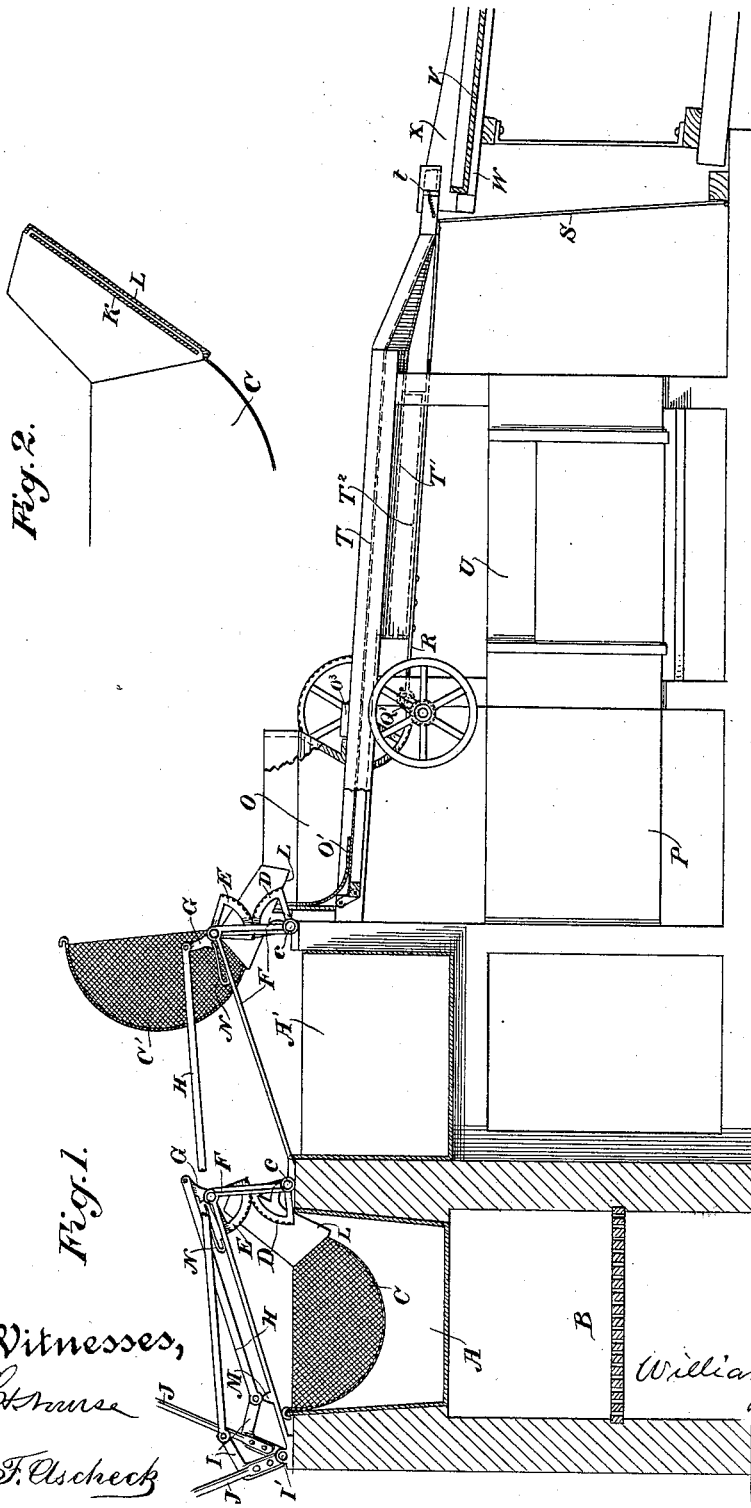
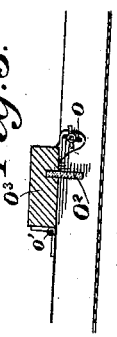
Witnesses,
Inventor,
William C. Anderson
By Dewey & Co.

No. 610,377. Patented Sept. 6, 1898.
W. C. ANDERSON.
APPARATUS FOR PREPARING PRUNES FOR DRYING.
(Application filed Sept. 1, 1897.)
(No Model.) 2 Sheets—Sheet 2.

Witnesses,
Inventor,
William C. Anderson
By Dewey & Co.
Attys.

UNITED STATES PATENT OFFICE.

WILLIAM C. ANDERSON, OF SAN JOSÉ, CALIFORNIA.

APPARATUS FOR PREPARING PRUNES FOR DRYING.

SPECIFICATION forming part of Letters Patent No. 610,377, dated September 6, 1898.

Application filed September 1, 1897. Serial No. 650,218. (No model.)

*To all whom it may concern:*

Be it known that I, WILLIAM C. ANDERSON, a citizen of the United States, residing at San José, county of Santa Clara, State of California, have invented an Improvement in Apparatus for Preparing Prunes for Drying; and I hereby declare the following to be a full, clear, and exact description of the same.

My invention relates to an apparatus which is especially designed for the preparation of prune fruits previous to their being exposed for drying.

It consists in details of construction and arrangement which will be more fully explained by reference to the accompanying drawings, in which—

Figure 4:
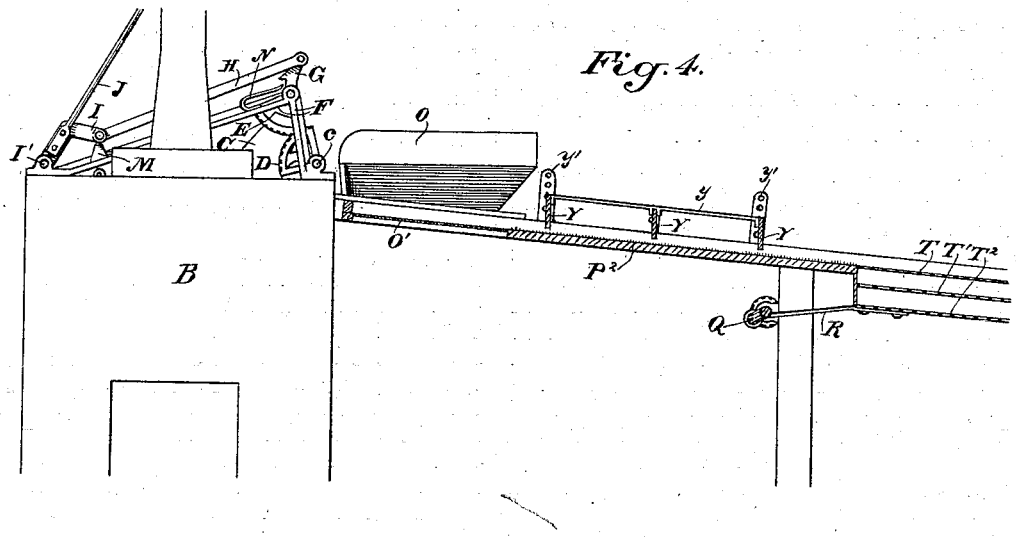
Figure 5:
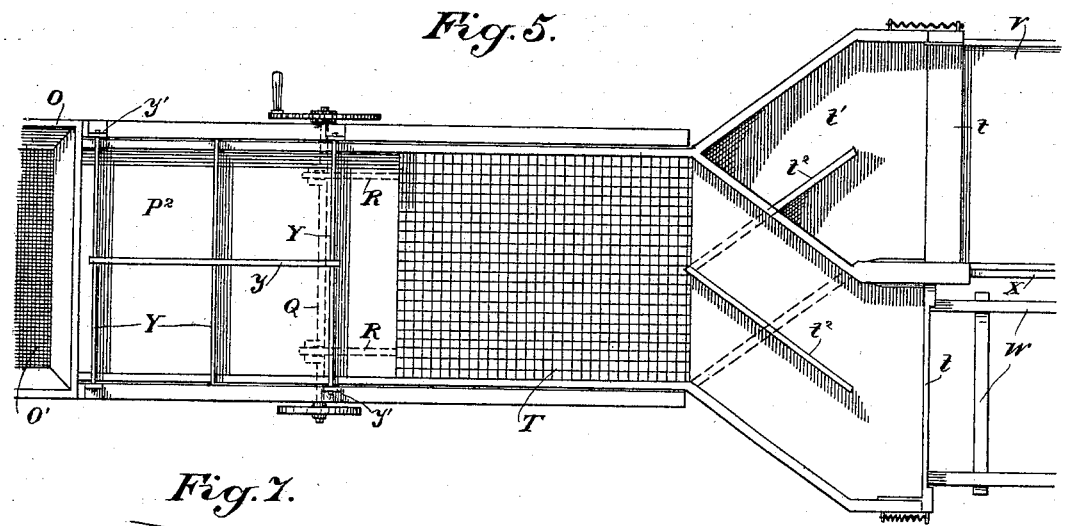
Figure 7:
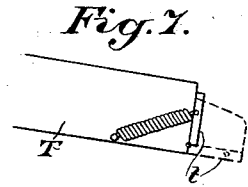
Figure 6:
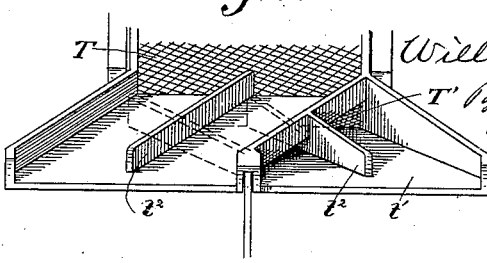

Figure 1 is a side elevation of my apparatus, showing vertical sections of the dipping-tanks. Fig. 2 is a section showing the discharge from the dipping-tanks and the liquid-returning device. Fig. 3 is a section showing the gate $O^2$ and attachment. Fig. 4 is a longitudinal view and partial section showing the gates used with perforator. Fig. 5 is a plan view of the same with grader and discharge-chutes. Fig. 6 is an end view of discharge-chutes. Fig. 7 is a side elevation showing discharge-gate.

The object of my invention is to provide a continuous apparatus by the use of which the fresh prune-plums are first dipped in a lye solution for the purpose of removing the bloom and sterilizing any ferment germs. Thence the fruit is delivered into a second dipping-tank and from this is delivered into a separator, where any dirt is separated from the fruit, thence to the graders or to an intermediate pricking device when the latter is used, and thence to the trays upon which the fruit is spread and conveyed to the fields for drying, the transfers being made successively and mechanically from one part to the other, so that the amount of handling of the fruit is greatly reduced and the number of operators and expense of the work is made much less than in the ordinary means employed for this class of work.

In my apparatus I have shown the first dipping-tank A set above a suitable furnace B, so that the weak solution of lye employed for the first treatment of the fruit may be kept at a boiling temperature. The use of this weak lye is to remove the bloom, to sterilize such ferment germs as may be found upon the fruit, while not interfering with the coloring-matter or destroying the cellular tissues of the fruit, the lye also acting as a germicide by its presence upon the exterior of the fruit until the latter has begun to dry. The fruit is first delivered into a basket C, having suitable meshes to contain the fruit, and this basket is so hung that it depends into the hot solution of lye, where the fruit is allowed to remain for three or four seconds, and is then discharged into a second container or basket C', which is in the same manner submerged in a tank A', the solution in which may be weaker than that in the first named or may be clean water for rinsing or washing the lye from the fruit. From this second basket the fruit is again discharged into a self-feeding hopper and thence upon the pricking-platform, over which it is passed for the purpose of perforating the skins of the fruit, and thence to the grader, by which the fruit is separated into sizes, and, finally, to the drying-trays, upon which it is spread.

If the pricking device is not to be used, as is found desirable in some cases, it may be omitted and the fruit carried directly to the grader; but the apparatus is capable of operating in either way desired.

The basket C is hinged to the framework of the furnace, as shown at c, and this hinge is in such a position that when the basket is tilted it will carry the discharge edge of the basket over beyond the receiving edge of the subsequent basket C', so that the fruit will be fairly delivered from one basket to the other.

The basket C has fixed to it a segmental pinion D, and this is engaged by a corresponding segment-rack E, which is fulcrumed in the angle of two meeting arms F, supported from the framework at the top of the furnace, as shown.

From the fulcrum-shaft of the segment E a lever-arm G extends upward and is connected by a rod H with one arm of the angular lever I. The other arm of this lever is fulcrumed to the framework, as shown at I', and a handle J extends upwardly from the angle of the lever I, so that the operator can move the apparatus by it.

The prunes, having been first delivered into the basket C and submerged in the hot lye, are immediately raised out of the lye by pulling upon the lever J, which, acting through the rod H, lever-arm G, and segments E and D, acts to tilt the basket C about its fulcrum-shaft $c$, so that the fruit will finally roll out into the second basket C', and when it is to be discharged from this basket the basket is operated in a similar manner by segments and levers.

When the fruit flows from the basket, more or less of the lye will drip from it, and in order to prevent this lye, which in time becomes dirty, from passing over into the second basket I have shown a table K, forming an extension or chute, over which the fruit passes, and beneath this is a pan-shaped device L, which is turned upwardly at the lower or discharge end. The table K does not reach quite to the upturned edge, so that there will be a channel left between the two, and when the table and basket have been tilted so that the fruit flows over the table to be discharged any drip from it will run down into the channel between K and L, remaining in the pan until the basket has been tilted back to its normal position of submergence within the tank A, when the lye that has fallen into this pan will be returned to the tank and prevented from passing into the second basket. The same arrangement serves to prevent the passage of the liquid from the basket C'.

The rear edge of the basket C is bent or has a border which hooks over the edge of the tank A. When the basket is submerged, a cushion M is suitably fixed with relation to the angular lever I, so that when the parts return to their place this lever will strike the cushion and be prevented from too heavy a jar.

A spring N is fixed upon the frame F, as shown, and when the basket is tilted to discharge its contents this spring strikes against a stop, which prevents too heavy a blow and checks the tilting of the basket.

When the fruit is delivered from the second basket C', it discharges into a receiver O, having a suitable screen bottom, as shown at O', and beneath this is a receiver P, into which any dirt which may be mixed with the fruit will sift through the screen and pass into the receiver P. From O the fruit may be delivered either directly upon a grader and thence to the drying-trays, or it may be first passed over a perforator and then to the grader. When it is passed over the perforator $P^2$, I employ gates, as shown at Y Y Y, connected by the bar $y$, and the ends of these gates are supported in standards $y'$, having holes, so that the gates may be raised or lowered, as desired. These gates are placed directly above the perforating-table $P^2$, and they prevent the prunes from piling up so deeply that some of them will not be perforated, as all of them must pass under the gates and will thus be perforated. From the perforator the fruit passes upon the grading-tables T T', as will be hereinafter described.

When the perforator is not used, I employ a gate such as shown at Fig. 3. This gate $O^2$ projects downwardly from a transverse bar $O^3$, extending across from one side of the machine to the other. This bar is hinged, as shown at $o'$, so that the front edge, carrying the gate $O^2$, can be raised or lowered about this hinge.

$o$ are slotted lugs fixed to the bar $O^3$ and extending upon each side of the grader-frames, having vertical slots made in them and thumb-screws or bolts passing through the slots, so that the gate may be raised or lowered and secured by these screws, as shown plainly in Fig. 3. In this case the graders T T', &c., will be close to the hopper O, as the perforator will have been omitted.

The grader has a shaking motion produced by means of a crank-arm Q upon any suitably-driven shaft, and this arm is connected by a pitman R with the shaking-frame, the latter being supported on springs S. These springs are fixed at the lower end and have the upper ends connected with the framework which is to be oscillated. The crank in turning pushes the spring-arm S forward, when it assumes a more nearly vertical position, and as the crank returns to its rearmost position the spring acts to press the oscillating framework backwardly with rapidity, and by reason of its dropping from its vertical toward a more inclined position it produces a sort of tossing motion of the frame, which will advance the fruit toward the discharge end. This device is applicable to either the combined perforator and grader or to the grader alone when the perforator $P^2$ is omitted.

The grader consists of three superposed trays, the upper one T having the largest meshes and receiving the fruit either from the dirt-separator O' or from the perforator $P^2$ when the latter is used.

The oscillation of the grader causes the fruit to gradually advance toward the discharge end of each screen, where it is delivered into chutes which diverge from each other, as shown in Figs. 5 and 6, so that the fruit may be delivered from the ends of the chutes upon the parallel rows of trays arranged to receive the two grades. The larger fruit passes over the upper tray and is diverted upon one series of trays, while the next grade passes through and falls upon a second screen T', having a somewhat finer mesh, and this discharges, as shown at $t'$, to one side of the discharge end of T, so that these two grades are thus separated at once from each other. Everything that passes through the screen T' falls upon a third screen $T^2$, and a further separation may take place at this point, the smaller fruit falling finally into a receiving-box U. From the discharge ends of the chutes the fruit passes directly upon the trays V, the flow being regulated by gates $t$, having springs so attached that the gates may be made to stand erect to temporarily check the flow of the fruit, and when it has accumulated sufficiently the gate is turned to a horizontal position and the fruit allowed to flow into the tray. These trays are placed on an inclined carrier W and are advanced as fast as they are filled with the fruit and removed and carried to the drying-place. The grade of the screen may be changed by any suitable means to regulate the flow of the fruit. As the two sets of carriers lie side by side to receive the fruit from the two discharges T and T', there is a division-strip or partition X between them to keep the fruit separate.

By this apparatus I am enabled to dispense with a great number of persons who have been hitherto employed to handle the fruit, it being the custom to handle it two or three times before it goes to the drying-trays. By my apparatus the fruit is first delivered into the dipping-basket and is afterward mechanically handled and delivered from one portion of the apparatus to the other successively until it is discharged onto the drying-trays with only a single handling.

Having thus described my invention, what I claim as new, and desire to secure by Letters Patent, is—

1. An apparatus for preparing fruit for drying consisting of baskets into which the fruit is received and immersed into dipping and washing tanks, means for causing the baskets to discharge from one to the other and an extension of the discharge ends of the baskets, having a channel for conveying the drip from the discharging fruit back into its own tank.

2. An apparatus for preparing fruit for drying consisting of dipping and washing tanks, baskets mounted therein and means for tilting the baskets so as to discharge the fruit therefrom, a table over which the discharging fruit passes and a pan below the table and separated therefrom, for conveying the drip from said table back into the tanks.

3. A fruit-preparing apparatus consisting of dipping and washing tanks, baskets and means for submerging them in said tanks, a combined table and drip-pan connected with each basket, for discharging the fruit from one basket to the other and returning the drip to the tanks, a dirt-separating device for the final basket, a grading mechanism beyond the dirt-separator, means interposed between said separator and grader for regulating the flow of the fruit from one to the other, carriers for the fruit and trays mounted thereon upon which the fruit is finally delivered and spread.

4. A fruit-preparing apparatus, consisting of dipping and washing tanks, baskets and means for submerging them in said tanks, a combined table and underlying drip-pan connected with the baskets for delivering the fruit from one to the other and for returning the drip to the tanks, a dirt-separating screen for the final basket, a perforator in line with and connected directly with the dirt-separator, a grader in line with and forming a prolongation of the discharge end of the perforator, a regulating-gate through which the fruit is delivered to the perforator and grader, means for oscillating the grader and a discharge and controlling gate through which the fruit passes and is delivered to the drying-trays.

5. In a prune-preparing apparatus, a furnace-heated tank adapted to contain caustic lye, a basket hinged upon one edge to the framework of the tank, having the opposite edge adapted to be supported so as to allow the basket to be submerged within the tank, a pinion at the hinge end of the basket and a second pinion having a lever mechanism connected with it whereby it may be rotated and the basket discharged, and a second basket into which the first-named basket discharges.

6. In a prune-preparing apparatus, a furnace-heated tank adapted to contain a dipping solution, a basket hinged at one side adapted to contain the fruit to be treated having the opposite edge so supported that the basket and contained fruit may be submerged in the tank, a mechanism whereby the basket may be tilted about this hinge-point to discharge its contents to the second part of the apparatus, a table over which the discharged fruit flows, and a pan situated beneath the table having upturned edges and a channel intermediate between it and the edge of the table whereby drippings from the fruit will pass through the channel and be arrested in the pan and returned to the tank when the basket is returned to its normal position.

7. An apparatus for preparing prune fruit consisting of a furnace-heated tank containing caustic alkali, a basket adapted to contain the fruit, hinged at one edge and having the other edge adapted to rest upon the opposite side of the tank whereby the basket and its contents may be submerged in said tank, segmental pinions, one connected with the basket, the other having a lever mechanism whereby it may be rotated and the basket discharged, and cushioned springs upon which the parts strike at the end of their movement in either direction.

8. An apparatus for preparing fruit for drying, consisting of a furnace-heated tank or tanks containing dipping and washing solutions, a basket hinged at one edge adapted to rest the opposite edge upon the framework of its tank whereby the basket and its contents are submerged, a discharge-table and drip-returning pan, a hinged segment and pinion and connected mechanism whereby the basket may be discharged and the contents delivered directly into the succeeding portion of the apparatus, a dirt-screen separator into which the fruit is received from the second basket, a receiver for the dirt and a regulating-gate through which the fruit is discharged from the dirt-cleaner.

9. In a fruit-preparing apparatus, a fruit-receiving basket having its discharge end formed or provided with a table and pan the latter separated from the table to form a channel to convey away the drip from the fruit.

10. In a prune-preparing apparatus, dipping and washing tanks, dipping-baskets having discharge-tables and drip-returning pans, a receiving-hopper with a regulating discharge-gate, a perforating-table over which the prunes are caused to pass from the hopper, and vertically-adjustable pendent gates extending across above the surface of the perforating-table.

11. In an apparatus for preparing prune fruit for drying, a furnace-heated lye-containing tank, and a second dipping-tank succeeding thereto, baskets hinged with relation to each of the tanks, the first adapted to receive the fruit and dip it into the hot alkali of the first tank, mechanism by which said basket is turned and its contents delivered into the washing-basket, means for separating the dripping from the fruit and returning it to the first tank, similar mechanism for discharging the second basket into the dirt-separating screen, a gate whereby the fruit is delivered from said screen upon the perforating or grading table, a mechanism for shaking said table consisting of inclined spring-arms, the upper ends of which are fixed to a permanent support, and a crank-arm and connecting-pitman whereby the tables are moved upwardly and forwardly and are returned backwardly and downwardly so as to advance the fruit over them.

12. In an apparatus for preparing prune fruit for drying, the dipping and washing tanks, automatically-operated dipping and discharging baskets and connected mechanism, a discharge-table and drip-returning pan carried by the hinged end of each basket, a dirt-separating screen, shaking-tables with mechanism by which they are actuated as herein shown, said tables comprising an upper, a central and lower screen of different meshes whereby the fruit is separated, said upper and second screens discharging through diverging chutes to right and left, and trays supporting carriers in line with each, whereby the fruit is automatically graded and successively delivered upon the drying-trays.

In witness whereof I have hereunto set my hand.

WILLIAM C. ANDERSON.

Witnesses:
 CHAS. A. SMITH,
 T. C. BARNETT.